APPARATUS FOR AUTOMATICALLY IDENTIFYING FINGERPRINT CORES

INVENTORS
JAY M. BERGER
WILBUR J. LEVINE
KASEM MALEK
BY Isidore Match
ATTORNEY

Feb. 2, 1971 J. M. BERGER ET AL 3,560,928

APPARATUS FOR AUTOMATICALLY IDENTIFYING FINGERPRINT CORES

Filed Sept. 25, 1968 5 Sheets-Sheet 2

United States Patent Office 3,560,928
Patented Feb. 2, 1971

3,560,928

APPARATUS FOR AUTOMATICALLY IDENTIFYING FINGERPRINT CORES

Jay M. Berger, Briarcliff Manor, and Wilbur J. Levine, Poughkeepsie, N.Y., and Kasem Malek, Tehran, Iran, assignors to International Business Machines Corporation, Armonk, N.Y., a corporation of New York

Filed Sept. 25, 1968, Ser. No. 762,433
Int. Cl. G06k *9/16*
U.S. Cl. 340—146.3 8 Claims

ABSTRACT OF THE DISCLOSURE

A document having a pattern to be recognized, such as a fingerprint, is first scanned at a first angle in one direction to determine a first set of points of tangency of scanning lines with fingerprint ridges and the addresses of the *x, y* coordinates of these points are stored in digital storage means. The scan is then rotated to an angle of about 60° to 120° to the first angle and a second scan is effected to produce a second set of like points of tangency and the addresses of the *x, y* coordinates of the second points are also stored. The addresses produced by both scans are respectively compared and that comparison between first and second scan addresses which shows a difference of less than a chosen value (the distance between adjacent ridges of the fingerprint) is the location at which the scans converge and which is substantially the focal point of the fingerprint. Such focal point is now reproducible, no matter what the angle of disposition of the fingerprint is in the viewing area.

CROSS-REFERENCE TO RELATED APPLICATION

Copending application of Kasem Malek for "Method and Apparatus for Pattern Recognition," Ser. No. 452,284, filed Apr. 30, 1965, now abandoned, assigned to the assignee of this application.

BACKGROUND OF THE INVENTION

This invention relates to pattern recognition and identification. More particularly, it relates to apparatus for automatically recognizing and identifying the focal point of fingerprint cores.

In fingerprint recognition and classification techniques, several characteristics are employed to identify a normal fingerprint. A well-known technique entails first the determining of a core point and then the counting of the number of ridges and the relative direction of various other identifiable points from the core. Such other identifiable points may include line endings, bifurcations, etc.

Un U.S. patent application of Kasem Malek for "Method and Apparatus for Pattern Recognition," Ser. No. 452,284, filed Apr. 30, 1965, and assigned to the same assignee, there is disclosed an apparatus for automatically recognizing the above enumerated characteristics of a fingerprint.

Generally, in an automatic fingerprint system, it would be necessary to identify individual characteristic locations with respect to a coordinate system, code the information, and store the results for eventual retrieval and comparison purposes. To insure that the individual characteristics of a given fingerprint are properly discerned, the focal point of the core of the print represents an advantageous choice as a reproducible reference point in such automatic system.

Accordingly, it is an important object of this invention to provide an apparatus for automatically identifying the focal points of fingerprint cores.

It is another object of the invention to provide an apparatus in accordance with the preceding object which is effective despite the orientation of the fingerprint.

SUMMARY OF THE INVENTION

Generally speaking, and in accordance with the invention, there is provided an apparatus for automatically identifying the focal points of cores of a fingerprint. The apparatus comprises means for scanning a fingerprint at first and second angles, means responsive to such scanning for producing first and second respective sets of points of tangency of scanning lines with the ridges of the fingerprint, and means for comparing the values of the points of the first and second sets to determine that pair of respective points from the sets whose values differ an amount less than a predetermined value, the pair of determined points being taken as the point where the scans converge.

The foregoing and other objects, features and advantages of the invention will be apparent from the following more particular description of a preferred embodiment of the invention, as illustrated in the accompanying drawings.

DESCRIPTION OF A PREFERRED EMBODIMENT

In considering the invention, it is to be understood that there is taken advantage therein the recurving and looping properties of loops and whorl patterns respectively. With the invention, there is obtained an orthogonal trajectory of the pattern's ridges, which is a curve intersecting every member of the pattern at right angles and contains only points of orthogonal intersection with ridges of the pattern. In accordance with the invention, it is proposed that the intersection of two of these trajectories at two arbitrary directions (acute angle, for example) intersect at the focal point of the fingerprint core. A proof of the foregoing proposition is shown in connection with the examples shown in FIGS. 1, 2 and 3.

Figure 1:
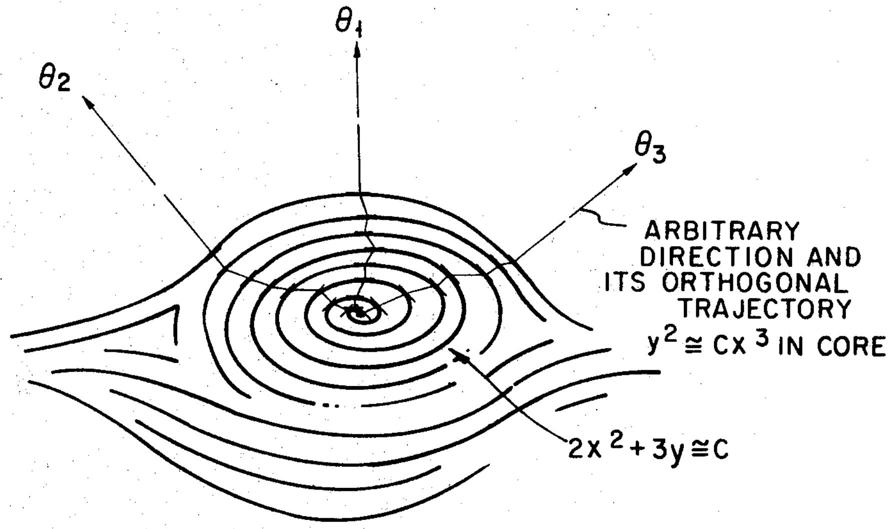
FIG. 1 shows an elliptical whorl type fingerprint core.

Referring to FIG. 1 wherein there is shown an elliptical whorl core of a fingerprint, let it be assumed that the whorl core pattern consists approximately of a number of concentric ellipses; an example is $$2x^2+3y^2=C_1$$

where the $x$ and $y$ intersections are taken to be $\sqrt{C_1/2}$ and $\sqrt{C_1/3}$ respectively. Differentiating and solving the result for $dy/dx$, there is obtained $$\frac{dy}{dx}=-\frac{2}{3}\frac{x}{y}$$

Now, if a curve is a member of the system at right angles $(x, y)$, this curve must have the negative reciprocal, i.e., $$3/2\,\frac{y}{x}$$

as the slope of its tangent $(x, y)$. Thus:

$$\left.\frac{dy}{dx}\right|_{\substack{\text{orthogonal}\\ \text{trajectory}}}=3/2\frac{y}{x}$$

The solution of this differential equation is $$y^2=Cx^3$$

The latter expression represents a family in which the curves are perpendicular to the tangent to the ellipse at the point of intersection. The family indicates that every orthogonal trajectory goes through the origin, i.e., the core.

Figure 2:
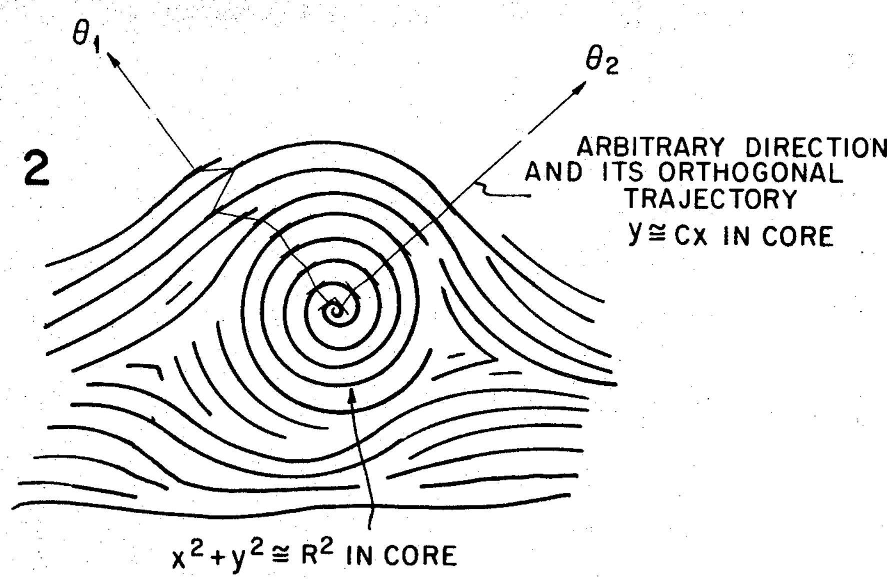
FIG. 2 shows a circular whorl type fingerprint core.

Reference is now made to FIG. 2 wherein the whorl core shown therein is more closely approximated by a set of concentric circles:

$$x^2+y^2=R^2$$

Using the same developing as was applied in the core shown in FIG. 1, there is obtained for orthogonal trajectories: $y=Cx$.

The foregoing demonstrates that any two of these curves taken at two separated angles is sufficient for core identification as they would intersect at the core. Accordingly, in accordance with the invention, apparatus is provided whereby an arbitrary direction such as normal to the platform ridges is selected, a horizontal scan is effected to obtain points of tangency and the loci of the tangency points are connected to obtain one of the curves. The process is repeated at an angle such as 60°, for example. In the unique situation where the selected arbitrary direction may not provide one of the two necessary intersecting trajectories, i.e., the trajectories do not intersect, then it would be necessary to obtain a third curve at a different angle until two intersecting orthogonal curves are obtained. Such situation may obtain in locating the fingerprint core patterns depicted in FIGS. 3 and 4.

Figure 3:
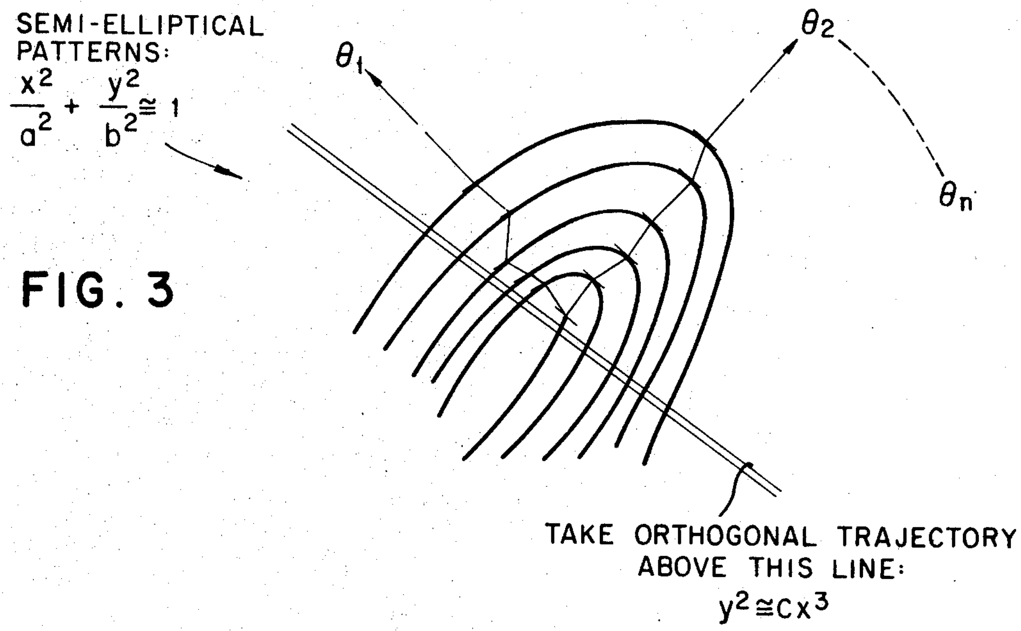
FIG. 3 shows an elliptical loop type fingerprint core.
Figure 4:
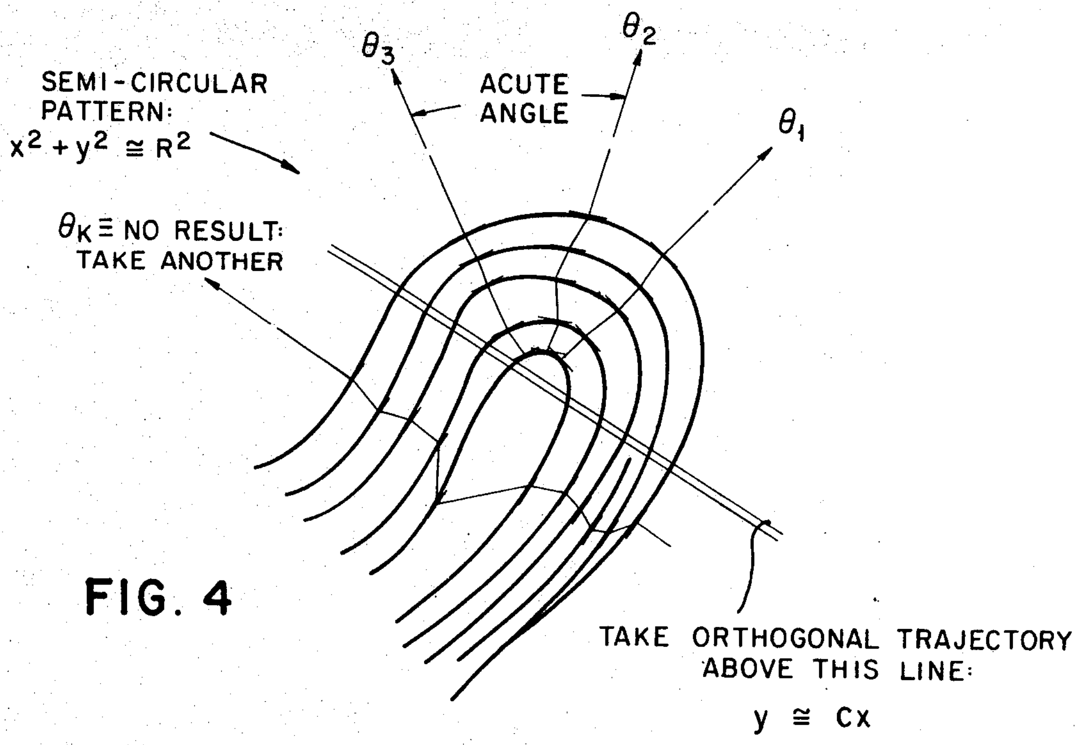
FIG. 4 shows a circular loop type fingerprint core.

FIGS. 3 and 4 depict elliptical and circular loop type cores. It is seen that in such cores, the centrally-located ridges do not make a complete circular or closed pattern; instead they "recurve." With such configuration, one 180-degree sector of a core area pattern resembles a semicircular or a semielliptical pattern and the remaining substantially half region of the core consists of ridges that merely extend in one direction. Consequently, in such patterns, the orthogonal trajectories will intersect only in the semicircular area, the latter area being the upper half of the image plane when the fingerprint is taken.

In the print shown in FIG. 3, the family of semiellipses is expressed by the equation $$\frac{x^2}{a^2}+\frac{y^2}{b^2}=1$$

In carrying out the invention, the orthogonal trajectories would be taken above the line. The orthogonal trajectories are expressed by $y^2=Cx^3$.

In the print shown in FIG. 4, the family of semicircles is expressed as $x^2+y^2=R^2$. The orthogonal trajectories are in accordance with the expression: $y=Cx$.

Figure 5:
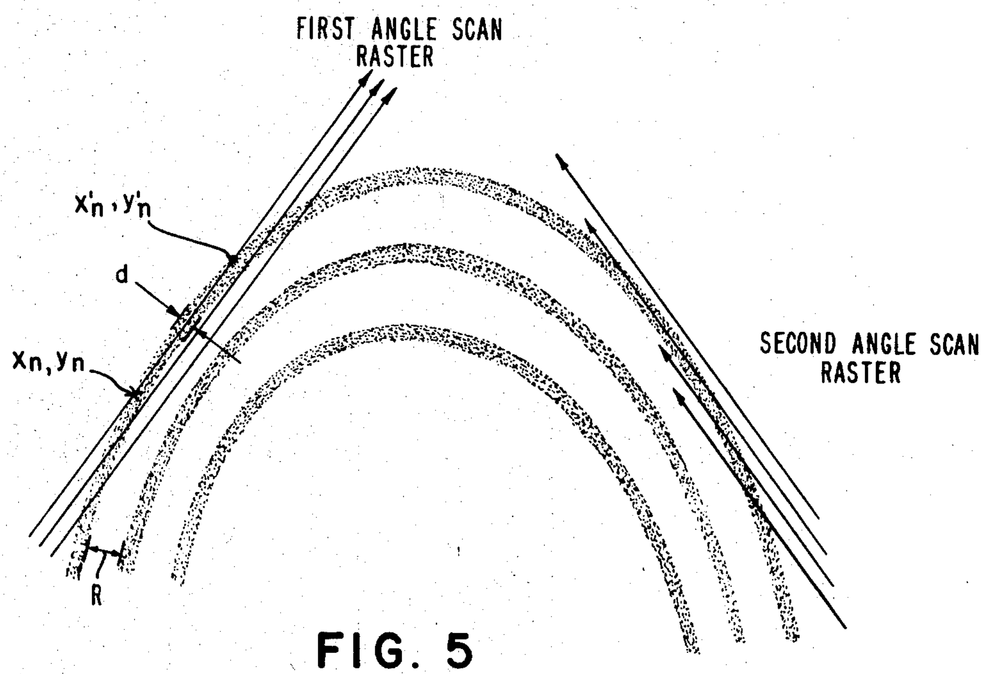
FIG. 5 depicts the scanning process according to the invention on a loop type core.

To understand how the focal point of the core of a fingerprint is determined by the apparatus according to the invention, reference is made to FIG. 5 for an understanding of the following steps:

(1) The projecting of the fingerprint on a viewing area or the otherwise selecting of an area of print for scanning to insure that the core is in an active area.

(2) The scanning across the print along a straight line making some first angle with the base of the print.

(3) The detecting of the transition from white to black and the digitizing of the $x_n$, $y_n$ coordinate.

(4) The detecting of the transition from black to white and the digitizing of the $x'_n$, $y'_n$ coordinate.

(5) The computation of the extent of line crossing from $x'_n-x_n$, and $y'_n-y_n$.

(6) If the line crossing extent exceeds $nd$ wherein $n$ is of the order of 2 or more and $d$ is the average thickness of scanned lines, the $x$, $y$ position of the point of tangency is recorded in the storage register as $$\frac{x_n+x'_n}{2},\ \frac{y_n+y'_n}{2}$$

(7) The increment of the scan perpendicular to the direction of the scan line by a quantity of approximately $d$.

(8) The repeating of steps (2) through (7) until the complete area is scanned with the recording of successive points of tangency in successive storage locations.

(9) The initiating of a scan at a second angle that differs from the first angle by approximately 60° to 120°.

(10) Steps (3) through (6).

(11) The comparing of the $x$, $y$ values of determined points of tangency in the second angle scan with stored values obtained in the first angle scan. If the differences in both the $x$ and $y$ points respectively are less than a predetermined constant of the order of R (ridge separation FIG. 5), then the $x$, $y$ point is identified as the reproducible point on the print. If the difference is greater than R, then the scan is incremented by an amount approximately equal to $d$ in a direction perpendicular to the scan line and steps (9), (10) and (11) are repeated.

It is, of course, to be realized that in the above steps, rather than varying the direction of the scan by rotating its raster electronically, the direction of the scan can be varied by rotating the print through a given angle.

Figures 6, 6A:
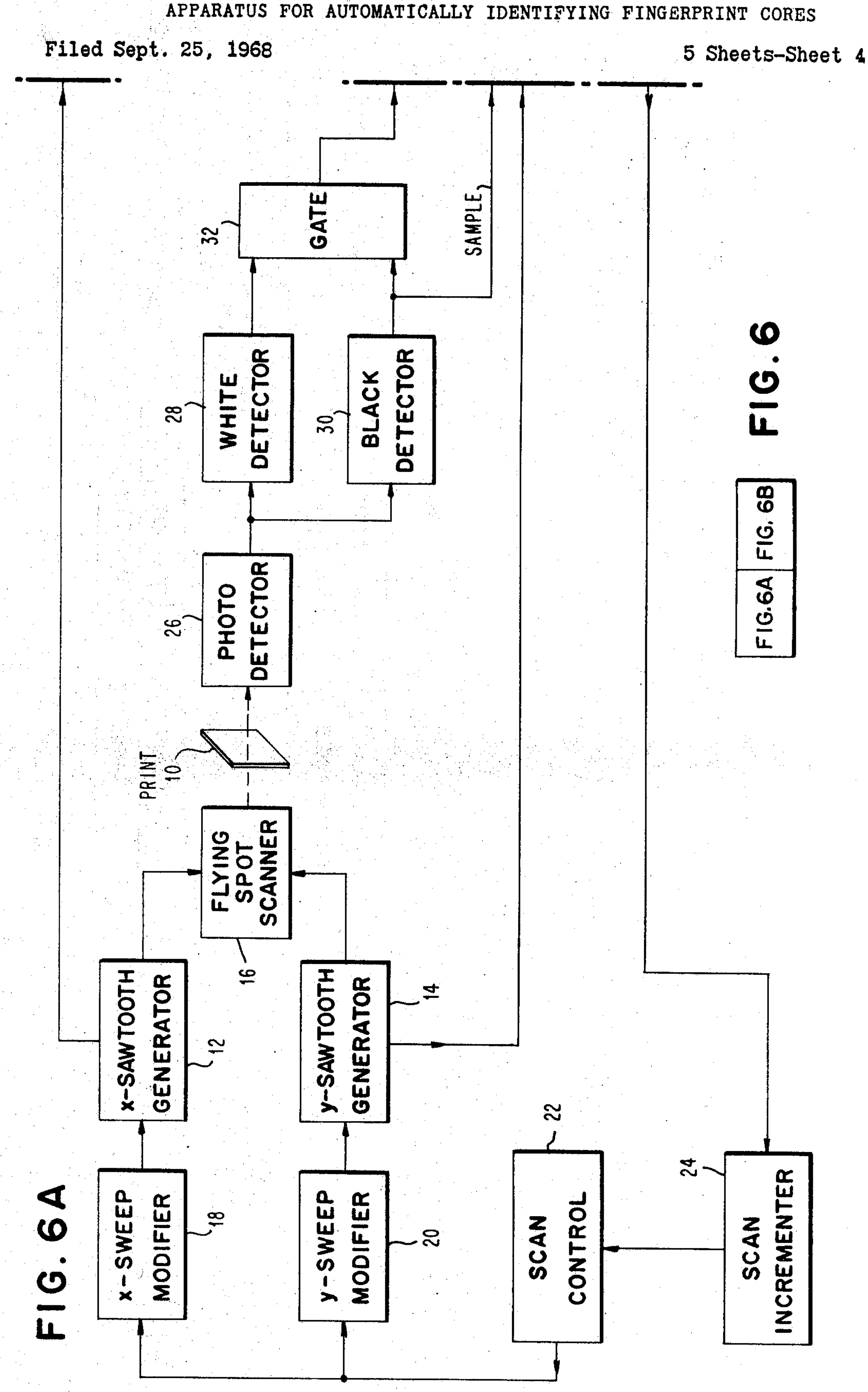
FIGS. 6A and 6B taken together as in FIG. 6 comprise a block diagram of an illustrative embodiment of an apparatus constructed in accordance with the principles of the invention.
Figure 6B:
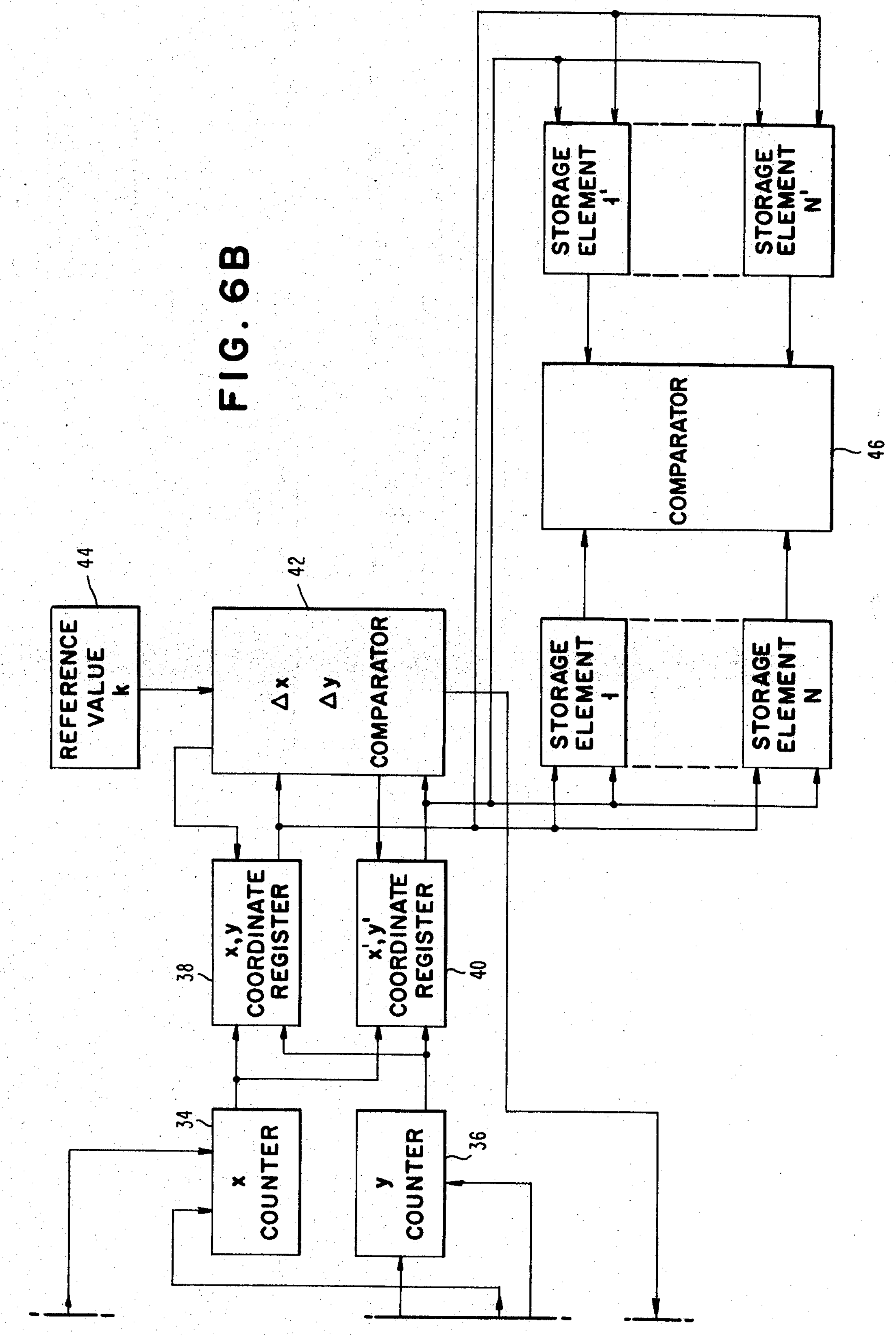

Reference is now made to FIG. 6 wherein there is shown an illustrative embodiment constructed according to the invention. To the extent that the material disclosed in the aforementioned application, Ser. No. 452,284, is applicable to this application, such material is incorporated into this application by reference. As seen in FIG. 6, the fingerprint on the document 10 to be processed is projected in a viewing area to assure that its core center is within an active scanning area.

To first scan point 10 along a straight line at some first angle with the base of print 10, there are provided an $x$-sawtooth generator 12 and a $y$-sawtooth generator 14 whose respective outputs are applied to a suitable scanning means such as a flying spot scanner 16. The $x$-sweep modifier 18, the $y$-sweep modifier 20 and the scan control stage 22 are circuits for manipulating the sawtooth generators which are well known in the art and detailed descriptions thereof are deemed unnecessary. The scan incrementer stage 24 is also a known circuit and is employed to shift the scan by varying a voltage level, for example.

The output of scanner 16 is applied to print 10 at the appropriate angle and the light therefrom will project therethrough, such light impinging on a suitable photodetector 26 from which the signal output will be applied to a white detector stage 28 and a black detector stage 30. The reason for providing both a black and a white detection at this juncture is, of course, to determine when the scanning beam has moved from a white area to a black area in the print. If it is assumed that the first area to be encountered by the scanning beam is white, the output of white detector 28 would condition a gate 32. Now as the scan progresses across the print, it will eventually encounter a black area, such encountering being detected by black detector stage 30 which will produce a first pulse at such time.

In order to effect the digitizing of the $x_ny_n$ coordinate (the point indicating the transition from white to black) and the digitizing of the $x'_ny'_n$ coordinate (the point indicating the transition from black to white), a pair of counters, viz an $x$-counter 34 and a $y$-counter 36 are provided which are arranged to operate in synchronism with $x$-sawtooth generator 12 and $y$-sawtooth generator 14 respectively. An $x$, $y$ coordinate registers stage 38 and an $x'y'$ coordinate registers stage 40 are provided for receiving the contents of $x$- and $y$- counters 34 and 36.

As soon as the black area encountering is detected by black detector 30, gate 32 is enabled to gate the contents of $x$ and $y$ counters 34 and 36 into $x$, $y$ coordinate registers stage 38 which now stores the address at which the black was encountered. As the scan progresses through the black, the exit from the black will cause a second pulse to be recognized and gate 32 will be effective to cause the output of the $x$ and $y$ counters to be placed into the $x'y'$ coordinate registers stage 40 which now stores the address at which the scan has left the black area.

The information stored in $x$, $y$ coordinate registers stage 38 and $x'y'$ coordinate registers stage are fed to a comparator 42 which contains a reference value K supplied from a stage 44. Reference value K is chosen to represent a thickness which exceeds somewhat the thickness of the black portion of a ridge of a fingerprint as shown in FIG. 5. In comparator stage the differences $x'-x$, and $y'-y$ are compared against the reference value. If the output of comparator 42 is greater than the reference value, the fact is recognized that the point of tangency on the scan of print has been encountered. If such contingency exists, then the outputs of coordinate register stages 38 and 40 are respectively read into a series of storage elements. As shown in FIG. 6, storage elements 1 to N receive the output of $x$, $y$ coordinate registers stage 38 and storage elements 1' to N' receive the output of $x'y'$ coordinate registers stage 40. In this connection, a suitable value for the selection of a given position as a point of tangency is $nd$ wherein $n$ is the order to two or more and $d$ is the average thickness of scanning lines. When a point of tangency is detected, the $x$, $y$ position thereof is advantageously recorded as $$\frac{x_n+x'_n}{2}, \frac{y_n+y'n}{2}$$

Such recording effectively provides a recording of the midpoint of the black which has been previously located. Relative to storage elements 1 to N, they suitably may be core or any other known type of digital storage device. If the output of comparator stage indicates that the reference value is not exceeded, registers 38 and 40 are reset.

When the output of comparator 42 indicates that reference value K is exceeded and the first tangency point is recorded in storage element 1, scan incrementer 24 is actuated perpendicular to the direction of the scan line, a suitable increment being $d$ (the average thickness of a scan line). Scanning is now repeated as already mentioned hereinabove with white and black detection until the next point of tangency is encountered and recorded in storage element 2. The scanning to find the points of tangency of the scan lines is continued until the complete area is scanned. It is realized that there are provided a suitable amount of storage units so that sufficient are available to store all of the respective points of tangency which are encountered in the scanning of the print area. At the completion of the scanning of an area, the storage elements will contain a series of $x$ and $y$ addresses which indicate the points on the fingerpoint which were tangent to the scanning beam.

The scan is now rotated through an angle suitably 60° to 120°, and a like series of steps are performed. To effect these steps, there may be employed partially a duplicate of the apparatus shown in FIG. 6, it being advantageous to employ at least separate storage elements 1' to N' for recording the points of tangency obtained during the rotated scan.

With the obtaining of the series of tangential points with the rotated scan in the sweeping of the appropriate area of the fingerprint and stored in storage elements 1' to N', there now remains the task of comparing in a logical component, such as a comparator 46, the respective sets of addresses, i.e., points of tangency, stored in storage elements 1 to N and 1' to N', the $x$ and $y$ components of these addresses being respectively compared.

If the difference between any given address stored in a storage element 1 to N and in the address stored in a corresponding storage element 1' to N' is less than a chosen constant representing a value R (FIG. 5), then such $x$, $y$ point is identified as the focal point of the print, i.e., the constantly reproducible point no matter what the orientation of the print is in the viewing area. The focal point is that point where the $x$ and $y$ addresses of both scans have converged on one another. In the event that no comparison shows a difference which is less than R, the rotated scan is continued until the focal point is obtained.

Figure 7:
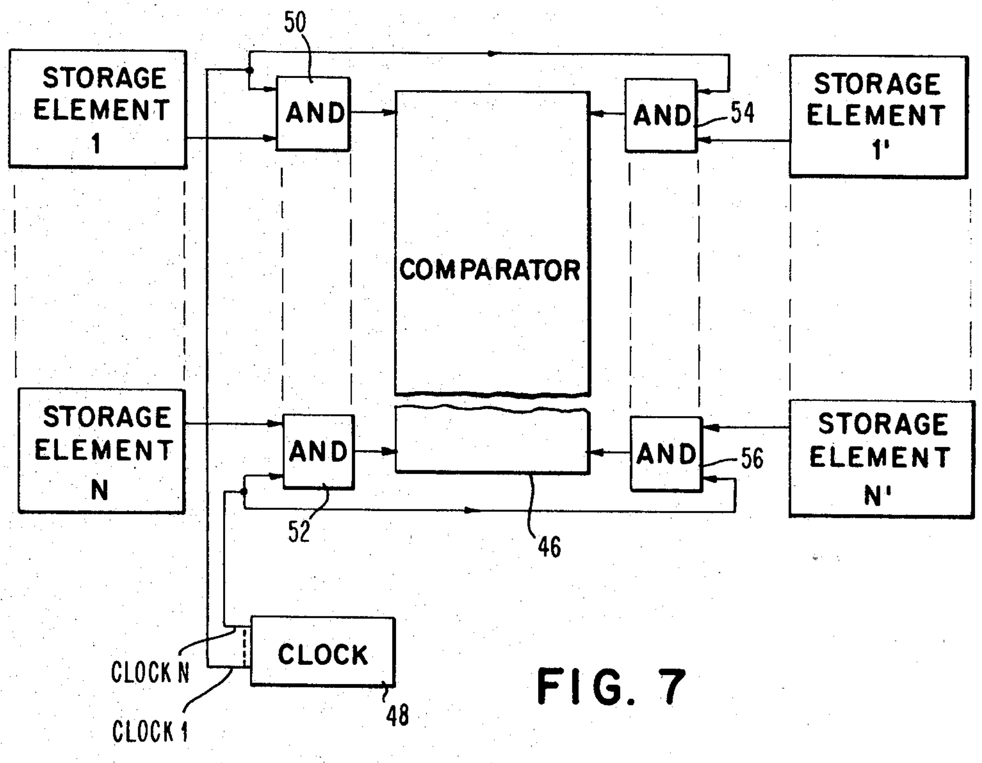
FIG. 7 is a block diagram of a variation of the embodiment shown in FIG. 6.

In FIG. 7, there is depicted an arrangement wherein there is compared the results of the second scan on a point by point basis with the first scan. To this end, there is provided a clock 48 to provide clock pulses 1 to N for making a point by point comparison in sequence, AND circuits 50 and 52 which are respectively enabled by a clock pulse and a storage element 1 to N output, and AND circuits 54 and 56 which are enabled by a clock pulse and a storage element 1' to N' output.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for automatically identifying the core of a fingerprint comprising a plurality of ridges which includes:

means for line scanning said fingerprint at first and second angles;

means responsive to said scanning for producing first and second respective sets of points of tangency of said scanning lines with said ridges; and means for comparing the respective values of the points of said first and second sets to determine that pair of points whose values differ by an amount less than a predetermined quantity, said pair of determined points being taken as the location where said scans converge.

2. Apparatus for automatically identifying the core of a fingerprint comprising a plurality of ridges which includes:

means for line scanning said fingerprint at first and second angles;

means responsive to said scanning for producing first and second digitized respective sets of points of tangency of said scanning lines with said ridges, said points being identified by their $x$ and $y$ coordinates; and means for comparing the respective coordinate values of the first and second sets to determine that pair of points whose $x$ and $y$ coordinate values differ by amounts less than a predetermined quantity, the coordinate values of said determined points being taken as substantially the coordinates of the location where said scans converge.

3. Apparatus for automatically identifying the core of a fingerprint comprising a plurality of ridges which includes:

means for line scanning said fingerprint at first and second angles which result in positive and negative slopes for said lines respectively;

means responsive to said scanning for detecting the points of transition during said scanning from white to black and from black to white;

means for digitizing the $x$, $y$ coordinates of said detected points;

first means for respectively comparing the $x$ and $y$ coordinates of each pair of successively occurring white to black and black to white digitized transition points;

means responsive to values resulting from said comparisons which exceed a chosen value for storing the coordinates of the transition points of said pairs of successively occurring points; and second means for comparing the respective $x$, $y$ coordinates of the stored points of said first and second angle scans to determine that pair of coordinates whose values differ by amount less than a predetermined quantity, said pair of determined coordinates being taken as the coordinates of the location where said scans converge.

4. Apparatus as defined in claim 3 wherein said white transition points are stored as $$\frac{x_n+x'_n}{2}, \frac{y_n+y'_n}{2}$$

wherein $x_n$ and $y_n$ are the coordinates of the white to black transition point and wherein $x'_n$ and $y'_n$ are the black to white transition point.

5. Apparatus as defined in claim 3 wherein said scanning means includes $x$ and $y$ sawtooth wave generators and wherein said digitizing means comprises $x$ and $y$ counters operating in synchronism with said $x$ and $y$ sawtooth generators respectively.

6. Apparatus as defined in claim 5 wherein said first comparing means includes a first register for receiving from said $x$ and $y$ counters, the digitized values of the $x$ and $y$ coordinates of the white to black transition points, a second register for receiving from said counters, the digitized values of the $x$ and $y$ coordinates of the black to white transition points, and means for comparing the values in said registers.

7. Apparatus as defined in claim 6 wherein said storing means comprises a first set of storage devices for storing the coordinate values of the transition points encountered in said first angle scan and a second set of storage devices for storing the coordinate values of the transition points encountered in said second angle scan.

8. Apparatus as defined in claim 7 wherein said second comparing means comprises means for receiving and comparing the values of the stored contents of said first and second sets of storage devices.

References Cited

UNITED STATES PATENTS 3,292,149 12/1966 Bourne.

MAYNARD R. WILBUR, Primary Examiner

W. W. COCHRAN II, Assistant Examiner